United States Patent [19]

Kovats et al.

[11] Patent Number: 4,569,445

[45] Date of Patent: Feb. 11, 1986

[54] APPARATUS FOR MEASURING THE THICKNESS OF DISC-LIKE ARTICLES

[75] Inventors: William S. Kovats, Oak Lawn; Charles T. Pratt, LaGrange Park, both of Ill.

[73] Assignee: AT&T Technologies, Inc., Berkeley Heights, N.J.

[21] Appl. No.: 543,661

[22] Filed: Oct. 19, 1983

[51] Int. Cl.⁴ .................... B07C 5/08; B65G 35/00; G01N 27/22

[52] U.S. Cl. .................... 209/539; 198/723; 209/571; 209/598; 209/701; 209/918; 324/61 R

[58] Field of Search ............... 209/539, 571, 572, 573, 209/698, 701, 917, 918, 919, 920, 924, 931, 934, 576; 198/546, 723; 250/223 R; 324/61 R, 61 P, 158 F

[56] References Cited

U.S. PATENT DOCUMENTS

| | | | |
|---|---|---|---|
| 2,100,227 | 11/1937 | Stoate et al. | 209/701 X |
| 2,518,045 | 8/1950 | May | 324/61 P |
| 2,562,575 | 7/1951 | Raesler | 324/61 R |
| 2,660,304 | 11/1953 | Box et al. | 209/698 X |
| 2,992,731 | 7/1961 | Edelman | 209/571 |
| 3,247,455 | 4/1966 | Benson, Jr. | 324/61 P |
| 3,272,309 | 9/1966 | Reading | 198/723 X |
| 3,613,868 | 10/1971 | Rickerd et al. | 198/723 |
| 3,679,972 | 7/1972 | Michelson | 324/61 R |
| 3,682,554 | 8/1972 | Flaczynski | 250/223 R X |
| 3,735,855 | 5/1973 | Johnson et al. | 198/723 X |
| 3,960,261 | 6/1976 | Planke . | |
| 3,990,005 | 11/1976 | Abbe et al. | 324/61 P X |
| 4,223,751 | 9/1980 | Ayers et al. | 209/571 X |
| 4,319,133 | 3/1982 | Currie et al. . | |
| 4,378,665 | 4/1983 | Crankshaw et al. | 198/723 X |
| 4,476,430 | 10/1984 | Wright et al. | 324/61 P X |

*Primary Examiner*—Robert B. Reeves
*Assistant Examiner*—Edward M. Wacyra
*Attorney, Agent, or Firm*—K. R. Bergum; M. de Picciotto

[57] ABSTRACT

An apparatus (10) for automatically feeding and measuring circular discs (12) includes a gauging station (15). The latter includes a pair of opposed capacitive displacement measuring probes (27 and 28). The probes are connected to a thickness measuring test set (66), adapted to provide a capacitance-derived measurement of the thickness of each advancing disc (12) at either one or a plurality of spaced measurement points (142) extending across the major surfaces thereof. Precise control must be maintained over the speed at which each disc is passed between the capacitive probes (27, 28) in a non-contacting manner. This is accomplished through the use of a controllably driven drive wheel (98), and a cooperative arcuate feed channel section (74), which includes an outer arcuate sidewall ramp insert (92). The drive wheel is formed with a resilient peripheral surface for initially frictionally engaging the periphery of each disc (12), when gravity-fed thereto and, thereafter, biasing the disc against, and driving it rotatably along, the inner wall of the ramp insert (92) at a precisely controlled speed. An adjustable disc-sensing assembly (125), which includes a rotatable platform (32) and a spaced pair of photodetectors (127 and 128) mounted thereon, edge portions of each disc (12) while advanced between the probes (27 and 28) and, thereby, control the START-STOP limits for each measurement period.

5 Claims, 8 Drawing Figures

APPARATUS FOR MEASURING THE THICKNESS OF DISC-LIKE ARTICLES

SUMMARY OF THE INVENTION

This invention relates to measuring apparatus and, more particularly, to such apparatus of the type for automatically and controllably advancing flat, circular articles seriatim through a thickness measuring work station.

BACKGROUND OF THE INVENTION

In order to make relatively high speed "on-the-fly" thickness measurements on circular disc-like piece parts or articles, it is often desirable to utilize measuring apparatus that is not only precise, but that does not require physical contact with the opposite major surfaces of the articles.

One particular need for such an apparatus, of primary concern herein, is in accurately and rapidly measuring the thickness of disc-like articles employed in telephone receivers. Such articles, hereinafter simply referred to as discs, are initially blanked out of ferrous strip stock material known as chromindur, manufactured by the present assignee, and are often as small as one inch in diameter, with a typical nominal thickness of 0.040 inch. When used in telephone receivers, the discs are ultimately formed into a cup-shape and magnetized. During such processing operations, the initial thickness of the blanked discs is of particular importance. This follows from the fact that if the discs are too thin, the magnetic properties of the ultimately formed cup-shaped receivers may be unacceptable, whereas if the discs are initially too thick, accelerated wear of the forming dies, or even catastrophic die failure, may result. As such, the blanked discs for one particular telephone receiver must have an initial thickness that does not vary by more than ±0.002 inch about a nominal thickness of 0.040 inch.

One thickness measuring technique that has been found well suited for the application in question is known as capacitive gauging. This technique involves the use of an opposed pair of non-contacting capacitive displacement probes. Such probes are coupled to an associated measuring circuit which provides an output signal that has a magnitude which is proportional to the thickness of the disc (or any other similarly configured article) being measured.

In addition to affording fast and accurate, non-contacting thickness measurements, a capacitance gauging technique also allows a plurality of measurements to be made at spaced points across the width dimension of each disc. The capacitive gauging probes per se also have the attributes of being relatively durable and stable and, therefore, suitable for even hostile manufacturing environments.

When the discs to be measured are of relatively small diameter, such as on the order of one inch, or less, there has been a need for a greater degree of control over their advancement through the thickness measuring station than can normally be attained by gravity feed. This is particularly the case when a plurality of thickness measurements are to be made at corresponding discretely spaced points on the opposite major surfaces of each disc.

In connection with the need for controlled advancement of each successive disc through the measuring or gauging station, it would also be very advantageous to be able to sense for any predetermined leading and trailing peripheral edge portions thereof. In that manner, reliable START-STOP limits could be readily established to define the maximum time window or period during which one or multiple thickness measurements could be performed on each disc.

SUMMARY OF THE INVENTION

In accordance with the principles involved in one preferred thickness measuring apparatus embodiment, disc-like articles are controllably advanced in succession through a thickness gauging station which employs a pair of opposed and aligned, non-contacting capacitive displacement measuring probes. The latter are connected to an electronic measuring test set adapted to provide a capacitance-derived indication of the thickness of each disc at either one or a plurality of spaced measurement points thereon, in accordance with a predetermined pattern. In making multiple thickness measurements on each disc, the measuring circuit is preferably adapted to provide an indication of the average of such measurements, as well as the deviation thereof, if any, from a predetermined nominal disc thickness. This may be most readily accomplished when the test set is operated under the control of a programmed microcomputer.

In making multiple thickness measurements on discs as small as 1 inch in diameter, very precise control must be maintained over the speed at which the discs are advanced between the capacitive probes. In accordance with an aspect of the present invention, such precision is accomplished through the use of a specially constructed and controllably driven drive wheel, and a cooperative arcuate feed channel that includes an outer wall-defining ramp portion. The base of the arcuate feed channel extends along a plane interposed between the measuring probes at the thickness gauging station, and includes an opening therein to expose the underside probe to the underside of each disc when advanced between the probes. The drive wheel is formed with a resilient peripheral surface positioned to initially frictionally engage the periphery of each successive disc fed thereto and, thereafter, to bias each disc against, and drive it rotatably along the inner surface, of the arcuate feed channel ramp portion at a predetermined and precisely controlled speed.

In accordance with another aspect of the invention, an adjustable disc-sensing assembly is employed to sense for predetermined leading and trailing peripheral edge portions of each disc while advancing through the gauging station. This sensing assembly includes an angularly adjustable circular platform which supports a pair of spaced photodetectors. The latter may be mounted in either fixed relationship (preferably diametrically disposed) on the platform, or optionally, adjustably positioned relative to each other. In either case, the outputs of the photodetectors provide signals for establishing controllable START-STOP limits of each measurement period.

DETAILED DESCRIPTION OF THE INVENTION

While the invention is described in detail herein primarily in regard to measuring the thickness of blanked out chromindur discs, which are ultimately employed in magnetized, cup-shaped form in telephone receivers, the illustrative apparatus embodied herein for that purpose is equally applicable for use in measuring diverse types of disc-like piece parts or articles, with similar beneficial results.

Figure 1:
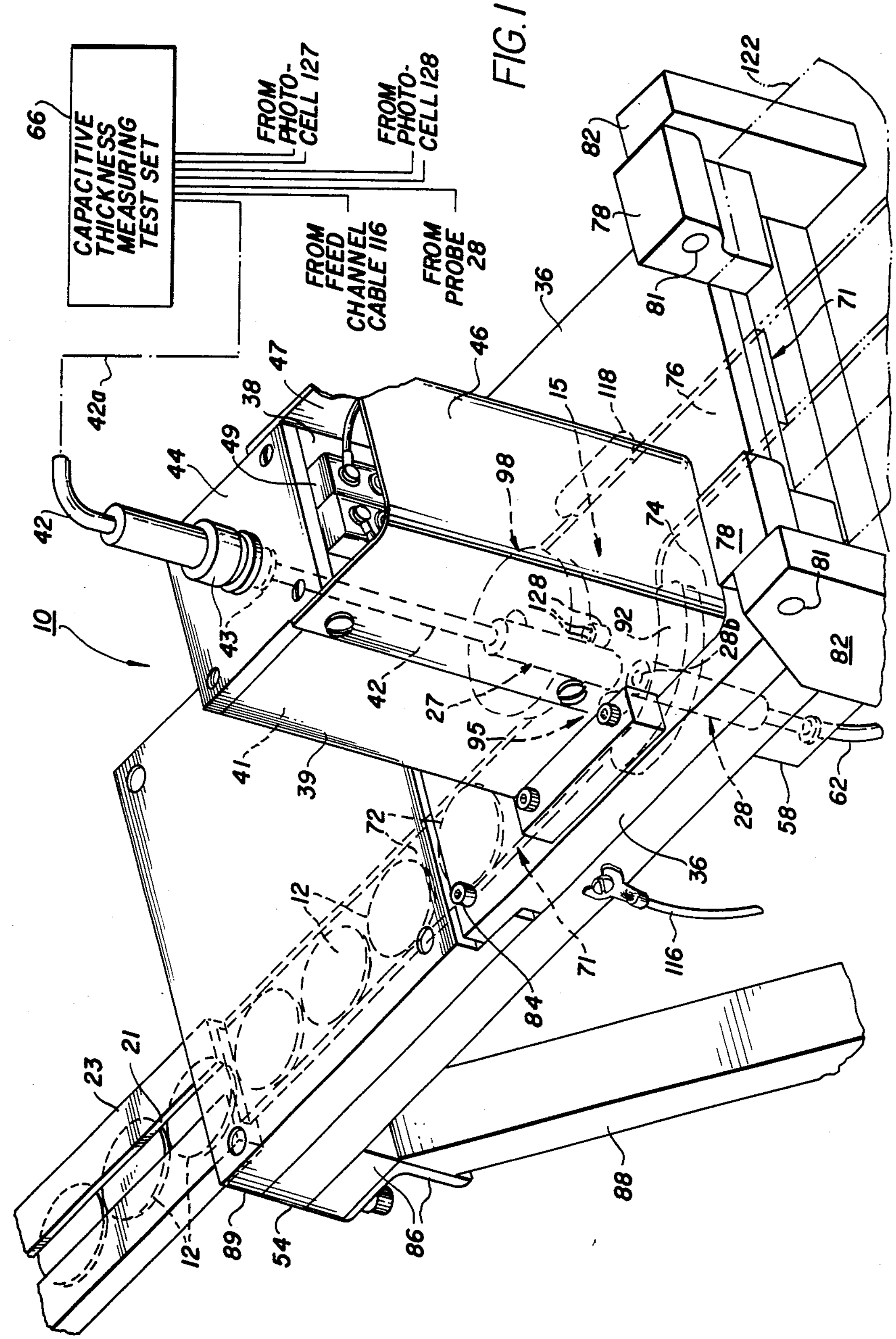
FIG. 1 is fragmentary perspective view of a thickness measuring apparatus embodying principles of the present invention.
Figure 2:
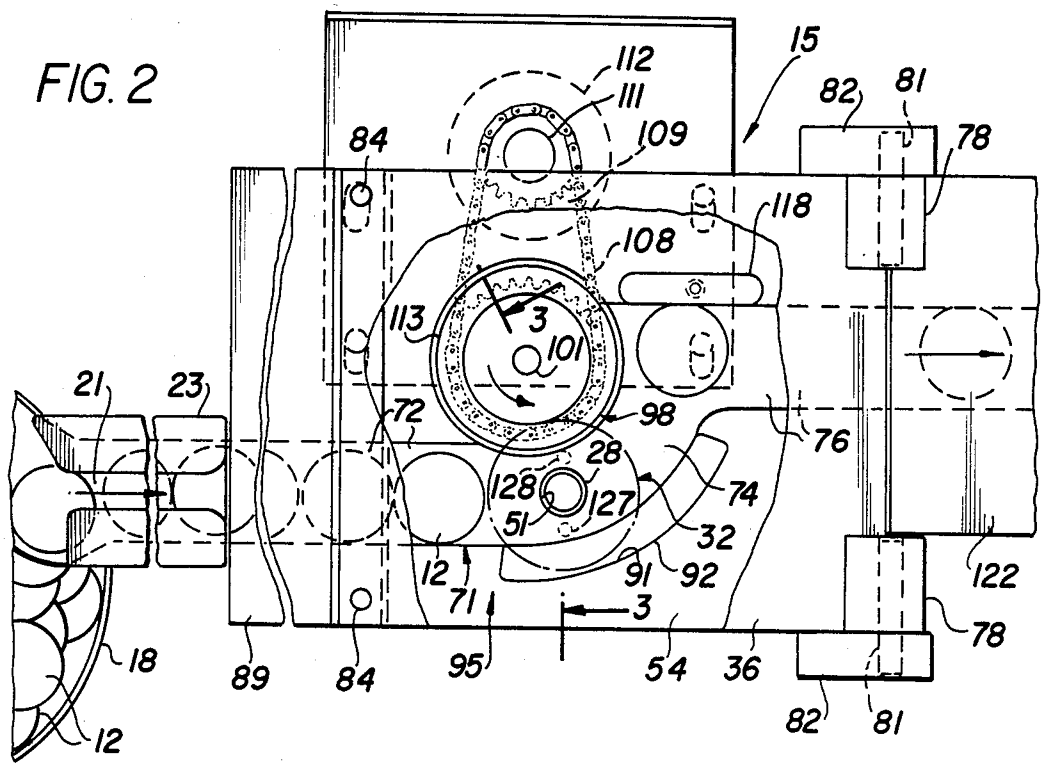
FIG. 2 is an enlarged, fragmentary plan view, partially broken away, of the measuring apparatus of FIG. 1.

With particular reference now to FIGS. 1 and 2, there is illustrated an apparatus 10 for automatically feeding an array of discs 12 through a capacitive measuring or gauging station 15, whereat the thickness of each disc is measured. Disc thickness is preferably measured at a plurality of spaced points extending across at least substantial coextensive portions of the major surfaces of each disc in accordance with a predetermined pattern, as will be described in greater detail hereinbelow.

The discs 12 are preferably initially fed in succession out of a vibratory supply bowl (only partially seen in FIG. 2), and then along a slotted channel 21 of an inclined feed chute 23 to the thickness gauging station 15.

Figure 3:
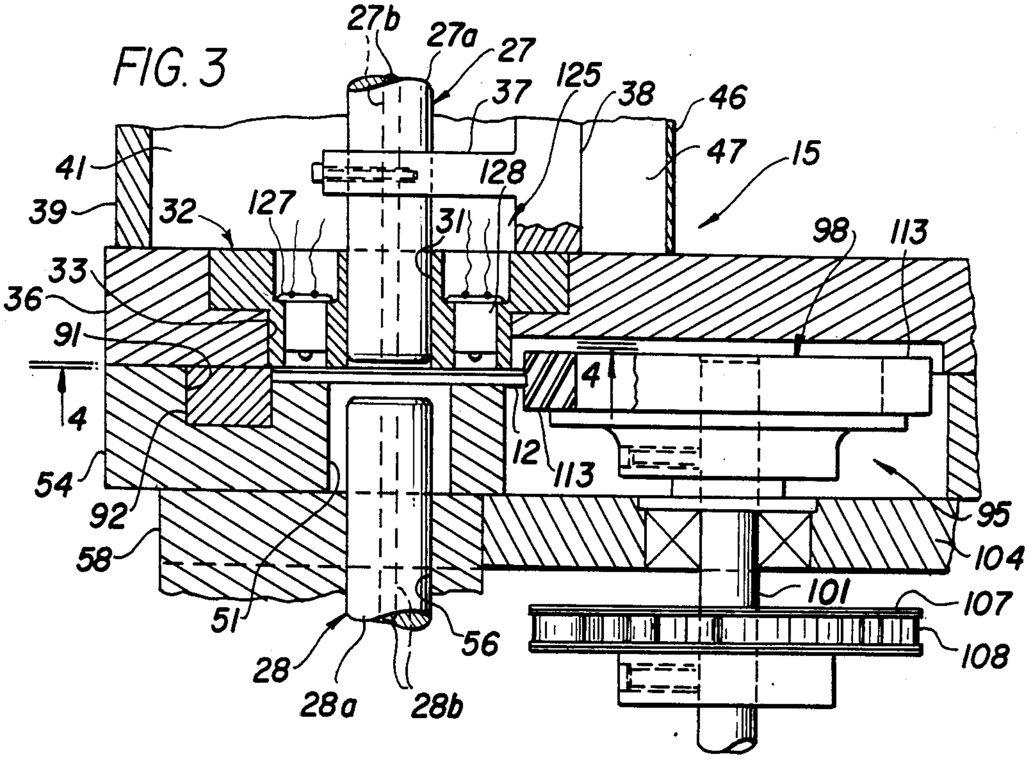
FIG. 3 is an enlarged, fragmentary detail sectional view of the disc feeding, sensing and capacitive probe measuring portions of the composite apparatus, taken along the line 3—3 of FIG. 2.

In accordance with an aspect of the invention, the gauging station includes an opposed and aligned pair of capacitive displacement measuring probes 27 and 28 (best seen in FIG. 3). Each probe has an outer insulative jacket or guard ring 27*a* or 28*a* that extends along the terminating end region thereof, and functions as both an r-f shield and insulator for a central conductive core 27*b* or 28*b* that constitutes the non-contacting sensor of the probe. Such probes advantageously provide reliable, high-speed, accurate, and stable thickness measurements, in a non-contacting manner, on diverse types of conductive articles having planar major surfaces, even when the latter are advanced at relatively high speeds between the terminating ends of the probes. The durable, rod-like construction of the probes also allows their use in even hostile manufacturing environments.

One particular probe that has been found very effective in measuring the thickness of metal discs of the type of primary concern herein is sold by the Lion Precision Corporation, under the code number PX-305-HTC. The central conductive core portion of that probe measures 0.220 inch in diameter, and is designed for use with a nominal standoff (or spacing) of 0.040 inch between the terminating end of the probe and the adjacent major surface of the article being measured. This nominal spacing assures that the probe will accurately measure variations in article thickness (which varies inversely with probe-article spacing) within a range of 0.020 inch (±0.010 inch). The measuring range of such a probe varies directly proportionally with the size of the sensing core at the terminating end of the probe, whereas the resolution (accuracy) of the probe varies inversely proportionally with core size.

As depicted in FIG. 3, the upper probe Z7 has a lower terminating end portion loosely confined within a receiving bore 31 of an insulative rotatable platform 32. The latter is nested within a stepped circular opening 33 of an upper support plate 36, and will be described in greater detail hereinbelow. A short distance above the platform 32, the probe 27 is releaseably secured within a bore of a split clamp 37 (seen only in FIG. 3) which, as shown, is formed in part by a sidewall 38 of an upwardly extending housing 39, defining an enclosed area 41 for the probe 27. The housing is secured, such as by suitable brackets and fastening members (not shown), to the upper support plate 36. The upper end of the probe 27 is connected through a cable 42 to a connector 43, which extends through, and is secured to, an apertured top wall 44 (see FIG. 1) of the housing 39. A U-shaped cover 46, secured to the housing 39, defines a partially enclosed area 47 for an optional interface-functioning terminal block 49, which is not of concern with respect to an understanding of the present invention.

The lower probe 28 has its uppermost terminating end confined within an oversized bore 51 formed in a lower support plate 54, with an intermediate portion of the probe being releaseably secured within a bore 56 of a lower support block 58. The latter is suitably secured to the underside of the support plate 54, such as by means of threaded fasteners (not shown).

The oversized bore 51 in the lower support plate 54 not only exposes an appreciable lower surface area of each successive disc 12, while advanced between the probes 27 and 28, but allows the lower probe to be adjustably and precisely aligned with respect to the upper probe 27. The conductive sensing cores 27*b* and 28*b* of the probes are connected by the aforementioned shielded cable 42 and a cable 62, respectively, to an associated and commercially available capacitive thickness measuring test set 66. Only the cable 42, for purposes of clarity, is shown directly connected to the test set via a symbolic cable-defining line 42*a*.

With reference again to the lower support plate 54, it is formed with a composite recessed disc-feeding channel 71 that includes, as best seen in FIGS. 1 and 2, a linear entrance section 72, an arcuate section 74, and a linear exit section 76. The major portion of the composite feed channel 71 is covered by the overlying support plate 36, including the aforementioned rotatable platform 32 nested therewithin. As best seen in FIG. 1, the downstream end of the support plate 36 is pivotally mounted on the lower support plate 54 through a pair of brackets 78 which, in turn, are rotatably coupled by pins 81 to respectively associated ones of a pair of support legs 82, with the latter being secured to the adjacent downstream end of the lower support plate. The cover plate 36 is releaseably secured to the lower support plate 54 by means of threaded fasteners 84. As thus pivotally mounted, the support plate 36 advantageously allows any of the disc measuring, sensing and feeding elements of the composite apparatus normally confined therebelow (and which will be described in greater detail hereinafter) to be readily exposed for cleaning, repair or replacement.

The opposite or upstream end of the lower support plate 54 is secured through a pair of brackets 86 to a pair of downwardly extending and inclined legs 88 (only one seen in FIG. 1). The lower ends of all of the support legs are adapted for securement to a suitable frame or to the floor (neither shown).

A cover plate 89, as also best seen in FIG. 1, is fixedly secured to the lower support plate 54, such as by suitable fasteners (not shown), and is interposed between the exit end of the feed chute 23 and the upstream end of the coplanar support plate 36. As thus positioned, it is seen that the cover plate 89 cooperates with the upper support plate 36 to define a continuously confining top wall or closure for the composite recessed feed channel 71 formed in the lower support plate 54.

The lower support plate 54 is also formed with an arcuate groove 91 (best seen in FIG. 3) that accommodates a close-fitting removable ramp insert 92, the latter forming a portion of the arcuate feed channel section 74. The significance of the ramp insert will be described in greater detail hereinbelow With reference again to the capacitive thickness measuring test set 66, it includes conventional signal sensing, comparing, processing and readout circuitry. When high speed multiple measurements are to be made, averaged and processed for readout in any suitable form, the measuring circuitry is preferably operated under the control of a programmed microcomputer in a well-known manner. One measuring test set applicable for use with the apparatus 10 embodied herein, and which may be employed with or without an associated programmed microcomputer, is sold by the aforementioned Lion Precision Corporation.

In accordance with the principles involved in a non-contacting capacitive displacement gauging technique, reliance is made on the space that exists between the terminating sensing core end of each probe and the adjacent major side of the disc being measured, which mutually disposed elements together effectively form a capacitor. As is well known, the parameters that determine the capacitance of such a capacitor includes the coextensive area (A) and spacing (S) between the capacitor elements, and the dielectric constant (K) of the medium therebetween which, in the present case, is air.

Figure 7:
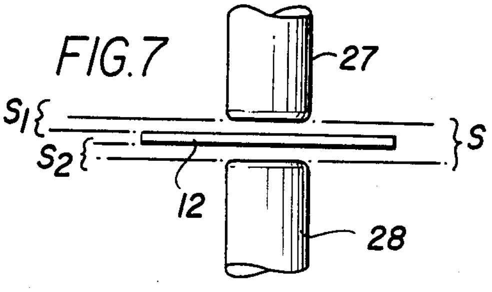
FIG. 7 is a fragmentary schematic view of the capacitive probes and an interposed disc, illustrating the spacings involved in establishing a capacitance-derived thickness measurement for the disc.

Thus, as employed in the composite apparatus 10 (as best seen in FIG. 7), the fixedly mounted, opposed and aligned capacitive probes 27 and 28 are seen to establish a permanent spacing (S) therebetween, which spacing serves as a stable reference measurement. In order to determine a given disc's thickness, the spacing ($S_1$) from the terminating end of the upper probe 27 to the adjacent upper major surface of an interposed disc 12, and the spacing ($S_2$) from the terminating end of the lower probe 28 to the adjacent lower major surface of the disc, are capacitively measured.

This is accomplished by the two effective capacitors being connected as part of an energized a-c circuit in the measuring system 66, in a well-known manner. The resulting current flow across each thusly defined capacitor is measured and electronically processed into thickness-equatable analogue signals. The magnitudes of these signals are then added together, and their sum thereafter subtracted from a signal of larger known magnitude representative of the fixed spacing (S). A resulting output analogue signal is thus produced that is directly equatable with the thickness (T) of the measured disc 12, at least in the discrete region of the disc that is interposed between the active core sensing areas of the probes during the momentary interval of a given measurement.

As previously noted, a capacitive gauging technique readily allows a plurality of thickness measurements to be made at different discrete points across the major opposed flat surfaces of each disc. Typically from 2 to 5 measurements are made and preferably averaged, with the averaged value then compared against a desired nominal disc thickness.

In order to insure that multiple thickness measurements are consistently made at uniformly spaced points on each successive disc, it has been found necessary to precisely control the speed of disc advancement through the capacitive gauging station 15 in a manner that is not possible when relying on only gravity feed. This is particularly the case when the discs are on the order of 1 inch or less in diameter, and when an appreciable number of measurements per disc are desired, or required, for a certain demanding application in which the discs are to be used.

To that end, and in accordance with another aspect of the invention, precise and adjustable control over the speed of each disc through the gauging station and, in particular, between the probes 27 and 28, is accomplished through the use of a uniquely constructed disc-feeding mechanism 95, which comprises part of the gauging station 15.

The mechanism 95, includes a specially constructed drive wheel 98 that is supported on the upper end of a drive shaft 101. The latter is suitably journaled in, and supported by, an auxiliary base plate 104 which is fixedly secured to the underside of the lower support plate 54, as best seen in FIG. 3. A lower end region of the drive shaft 101 is coupled through a driven sprocket 107 and chain 108 to a drive sprocket 109 which is secured to a shaft 111 of a power source 112, such as an adjustably controlled electric motor, shown only in phantom in FIG. 2.

The drive wheel 98, as best seen in FIG. 3, is formed with a resilient peripheral surface, such as in the form of a replaceable layer 113 of silicone rubber. The spacing between the outer surface of the resilient layer and the inner surface of the aforementioned arcuate ramp insert 92 is chosen to be slightly smaller than the nominal diameter of each disc 12. As such, the drive wheel will frictionally engage each disc, when gravity fed thereto, and forcefully bias it against, and rotatably and controllably advance it along, the arcuate ramp insert 92 of the feed channel 74. This also establishes a reliable electrical ground for each disc through the composite feed channel 71, of the lower support plate 54, which is connected through a common ground return cable 116 (see FIG. 1) to the test set 66. Such a ground return is thus seen to complete the aforementioned a-c capacitive circuits defined by the probes and each interposed disc.

The drive wheel 98 and cooperative arcuate ramp insert 92 are thus seen to reliably and consistently advance each disc 12 at the same predetermined rate of speed through the gauging station 15. The particular diameter of the discs to be measured, as well as the number of thickness measurements to be made on each disc will, of course, also have a direct bearing on the speed at which the discs may be successively advanced through the gauging station.

As previously noted, the outer sidewall of the arcuate feed channel 74 is preferably formed as a removable insert 92. This allows the ramp insert 92 to be periodically replaced, or the inner surface thereof to be periodically refinished. This may prove necessary with respect to both the ramp insert and the resilient peripheral layer 113 of the drive wheel 98 when the discs to be measured are not only relatively thin, but of relatively abrasive material, as is the case with the discs 12 of primary concern herein. Should disc contact over an appreciable period of time be allowed to form a detrimental groove in either of the contacting surfaces of the elements in question, the drive wheel 98 could not always be assured of firmly frictionally engaging each successive disc and, thereafter, positively and uniformly driving it along the arcuate ramp insert 92 and, particularly, between the capacitive probes 27 and 28.

Also, because of the typical abrasive nature of the discs 12 when formed of metal or a metal alloy, another removable feed channel sidewall insert 118 (FIGS. 1 and 2) is preferably employed as part of the linear feed channel section 76, which is positioned on the downstream side of the gauging station 15. As positioned, the insert 118 receives the initial impact of each successive disc 12 immediately after being forcefully released from frictional engagement with the drive wheel 98, typically at a rate of 2 to 5 discs per second in one illustrative application.

As each successive disc 12 exits from the linear feed channel section 76 into a communicating downstream feed chute 122 (only partially seen in FIGS. 1 and 2), which is preferably downwardly inclined, the discs are normally sorted by a conventional sorting mechanism (not shown) into an appropriate number of categories. Such categories may represent, for example, either satisfactory or unsatisfactory discs, or undersized, satisfactory or oversized discs.

Such a sorting mechanism may take many different forms, such as actuable deflectors, pins, air blast ejectors, energizable magnets, or trap doors formed along the exit end of the chute 122, by way of example only. Such actuable elements may be readily operated under the control of, and in response to, signals generated by the measuring system 66 in a well-known manner.

In accordance with another aspect of the invention, an adjustable article sensing assembly 125 is also employed as part of the gauging station 15, as best seen in FIGS. 2–5. The sensing assembly includes the aforementioned rotatable platform 32, which is adapted to support two spaced, and preferably diametrically disposed, sensors 127 and 128. The latter preferably comprise photodetectors which are respectively employed to sense for any predetermined leading and trailing peripheral edge portions on each disc 12 while advanced through the gauging station, and in particular, between the measuring probes 27 and 28.

The platform 32, as previously noted, is angularly adjustable by being nested within the aforementioned circular stepped opening 33 formed in the upper support plate 36. Two arcuate keyway slots 131 and 132 (see FIG. 4) are formed in, and extend through the platform. Each of these slots allows a threaded fastening member 136 or 137 to be inserted therethrough, and firmly secured within an aligned one of two tapped holes 138 or 139 (see FIG. 5) formed in the upper support plate 36.

Figure 4:
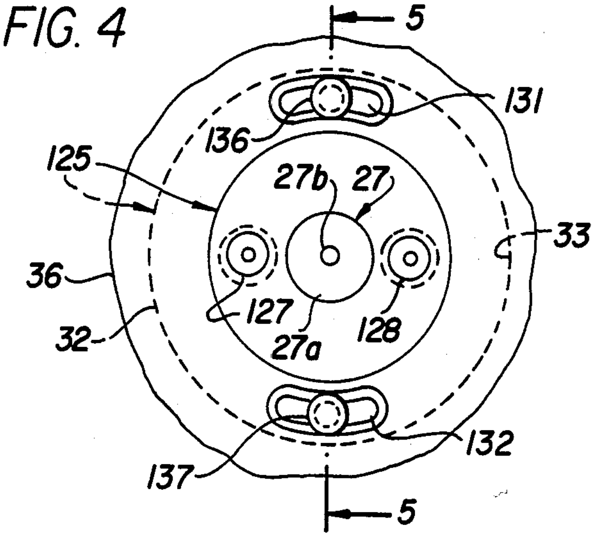
FIG. 4 is an enlarged plan view, taken along the line 4—4 of FIG. 3, of the rotatably adjustable disc sensing assembly.
Figure 5:
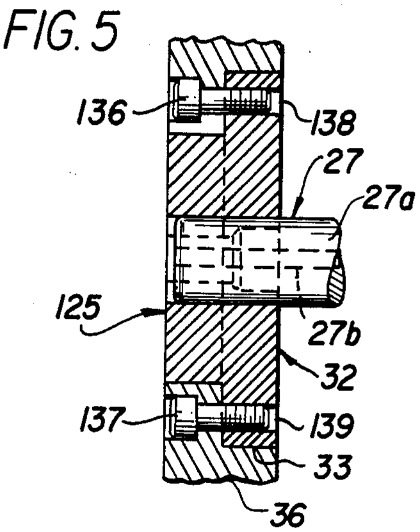
FIG. 5 is an enlarged, fragmentary cross-sectional view of the disc sensing assembly, taken along the line 5—5 of FIG. 4.

As thus mounted, and as best seen in FIG. 4, the platform 32 may be angularly rotated a predetermined number of degrees in either direction. As the angular position of the platform is varied, it is readily seen in FIG. 6 that the photodetectors 127 and 128 will necessarily sense leading and trailing peripheral edge portions on each advanced disc 12 which will likewise positionally vary relative to an arcuate center line 131, that defines the axial path of travel of each disc while advanced between the capacitive measuring probes 27 and 28.

Figure 6:
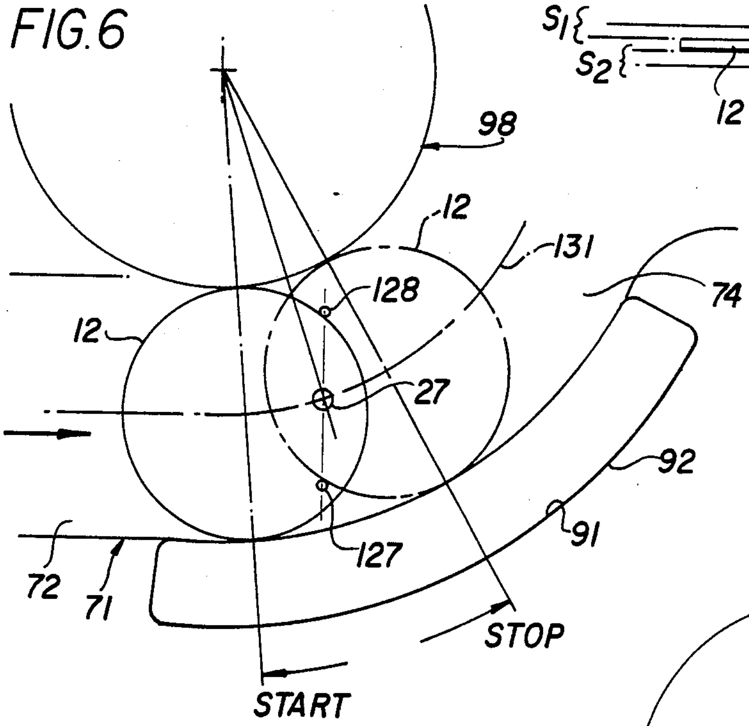
FIG. 6 is a schematic illustration of the rotation of a disc while being advanced along the associated arcuate feed channel from the position shown in solid line form to the position shown in phantom line form, respectively representative of illustrative photodetector-defined START-STOP limits for a measurement period.

It also becomes readily apparent from an examination of FIG. 6, that the spacing between the photodetectors 127 and 128, as well as their positions relative to the axis of the platform 32, will have a bearing on the degree of surface area on each disc 12 over which the thickness measuring points may extend. The outputs of the positionally adjustable photodetectors are applied as control-signal inputs to the measuring system 66, and advantageously provide the means for precisely establishing the START-STOP limits, or time window, of each measurement period for any given sized disc 12.

Figure 8:
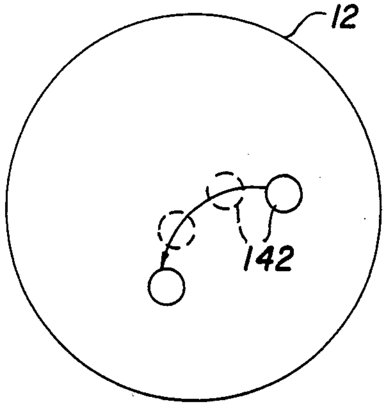
FIG. 8 is a plan view showing a pattern of four illustrative thickness measuring test points produced when the disc is rotated 90 degrees between the START-STOP limits defined by the photodetectors, when oriented as in FIG. 6.

It will be appreciated that the spaced points at which a plurality of measurements are made on each disc can define an infinite number of arcuate or sinuous patterns. This follows as a result of the compound displacement imparted to each disc 12 while advanced between the capacitive probes and, particularly, on the degree of rotational displacement imparted to each disc during a given total measurement period. By way of example only, with the photodetectors 127 and 128 angularly oriented so as to establish the START-STOP limits illustrated in FIG. 6, and with each disc being rotated 90° while advanced along the center line arc 131 between the defined limits, an arcuate or semi-circular pattern of four equi-spaced thickness measurement points, for example, may be readily established, as represented by the bull's-eye circles 142 in FIG. 8.

As an optional modification of the disc-feeding mechanism 95, a continuously advancing closed-loop belt (not shown) could also be employed to perform the same function as achieved with the rotatable drive wheel 98. In that case, the belt could be readily supported and guided so as to define a linear section therealong adapted to frictionally engage and, thereafter, advance each disc 12 with compound displacement along a linear (as distinguished from arcuate) path of travel between the measuring probes. Such a path would be further defined by the composite feed channel 71 including a cooperating linear sidewall portion, or insert (not shown). In such a modified arrangement, either the outer surface of the belt, or the mating surface of a linear backing member therefor, could be formed with the necessary resilient surface. With such a modified disc-feeding mechanism, the capacitive measuring probes 27 and 28 could either be positioned along the center-line of the thusly defined interposed linear section of the composite feed channel, or they could be aligned a predetermined distance on either side of the center-line to produce a predetermined non-linear pattern of measurement test points, as in the case with the drive wheel 98.

While one preferred capacitive probe measuring apparatus embodiment has been disclosed herein for particular use in measuring the thickness of flat, circular articles, such as in the form of chromindur discs ultimately employed as cup-shaped, magnetized elements in telephone receivers, it will be apparent that various modifications may be made to the present illustrative embodiment of the invention, and that a number of alternative related embodiments can be devised by one skilled in the art without departing from the spirit and scope of the invention.

What is claimed is:

1. An apparatus for measuring the thickness of disc-like articles, comprising:

first feed means for advancing such articles from a supply thereof, in succession, to an entrance end of a measuring station;

gauging means located at said measuring station and including a pair of opposed capacitive probes spaced to receive each advanced article therebetween;

circuit means coupled to said probes for applying a predetermined energizing voltage across each probe and an interposed article, and for measuring the value of capacitance thereby established by each probe and the respectively adjacent major surface of the article under measurement, said circuit means further being adapted to provide a capacitance-derived output utilization signal having a magnitude that is correlated with the thickness of the article under measurement;

second feed means located at said measuring station, and having an entrance end that communicates with an exit end of said first feed means, for controllably advancing each article, when fed thereto, seriatim, to an exit end of said second feed means along a path that passes between said probes, said second feed means including a drive member with a resilient surface, a feed channel disposed along said path and including a base formed with a probe-exposing aperture therein, and an electrically grounded sidewall-defining portion, the inner surface of which being spaced from said drive member so that each successive article, when advanced into frictional engagement with the resilient surface of said drive member, is continuously advanced by the latter at a predetermined speed with compound rotational and linear displacement along said sidewall-defining portion and between said probes; and a rotatably adjustable platform positioned so as to be adjacent one major surface of each article advancing between said probes, said platform having two spaced sensors mounted thereon and positioned on opposite sides of the pair of probes to sense for angularly adjustable leading and trailing peripheral edge portions on each successively advanced article, and for generating respective output signals in response to such sensed edge portions, whereby said output signals are applied to said circuit means for controlling a time window during which a plurality of thickness measurements are made at different spaced points across the major opposed surfaces of each advancing article.

2. An apparatus in accordance with claim 1 wherein said drive member comprises a circular drive wheel, and wherein said sidewall-defining portion of said feed channel comprises a removable insert having an arcuate inner surface with the same axis of curvature as said drive wheel.

3. An apparatus in accordance with claim 2 wherein said article sensors comprise photodetectors, and wherein third feed means communicates with the exit end of said second feed means, for directing each article upon being measured to a predetermined storage area.

4. An apparatus for measuring the thickness of disc-like articles, comprising:

first feed means for advancing such articles from a supply thereof, in succession, to an entrance end of a measuring station;

gauging means located at said measuring station and including a pair of opposed capacitive probes spaced to receive each advancing article therebetween;

circuit means coupled to said probes for applying a predetermined a-c voltage across each probe and an interposed article, and for measuring the value of capacitance thereby established by each probe and the respectively adjacent major surface of the article under measurement, said circuit means further being adapted to provide a capacitance-derived output utilization signal having a magnitude that is correlated with the thickness of the article under measurement;

second feed means located at said measuring station, and having an entrance end that communicates with an exit end of said first feed means, for controllably advancing each article, when fed thereto, seriatim, to an exit end of said second feed means along an arcuate path that passes between said probes, said second feed means including a rotatably driven wheel with a resilient peripheral surface, an arcuate feed channel disposed along said path and including a base formed with an aperture therein to expose the probe positioned on the underside thereof to an article when advanced along said base, and an electrically grounded removable sidewall-defining ramp insert, the inner surface of which is spaced from said drive wheel so as to result in each successive article, when advanced into frictional engagement with the resilient peripheral surface of said drive wheel, being compressively biased and electrically grounded against said ramp insert, and being continuously advanced at a predetermined speed with compound rotational and linear displacement along said ramp insert and between said probes;

an article sensing assembly including a rotatably adjustable platform positioned so as to be adjacent one major surface of each article when the latter is advanced between said probes, said platform having two spaced photoelectric article sensors mounted thereon to sense for angularly adjustable, predetermined leading and trailing peripheral edge portions, respectively, on each such successively advanced article, and for generating respective output signals in response to such sensed article edge portions, said output signals being applied to said circuit means for controlling a selectively adjustable time window during which a plurality of thickness measurements are made at different spaced points across the major opposed surfaces of each advancing article; and third feed means communicating with an exit end of said second feed means, for directing each article upon being measured to a predetermined storage area.

5. An apparatus in accordance with claim 4 wherein said circuit means is adapted to provide an output utilization signal that is representative of the average of all of the article thickness measurements.

* * * * *